United States Patent
Schmidt et al.

(10) Patent No.: US 7,784,806 B2
(45) Date of Patent: Aug. 31, 2010

(54) INDEPENDENT WHEEL SUSPENSION FOR THE REAR WHEELS OF MOTOR VEHICLES

(75) Inventors: Walter Schmidt, Rennertshofen (DE); Hugo Muller, Rohrenfels-Ballersdorf (DE); Hans Jurgen Brandl, Weichering (DE); Friedrich Killian, Hitzhofen (DE)

(73) Assignee: Audi AG, Ingolstadt (DE)

( * ) Notice: Subject to any disclaimer, the term of this patent is extended or adjusted under 35 U.S.C. 154(b) by 489 days.

(21) Appl. No.: 11/476,765

(22) Filed: Jun. 29, 2006

(65) Prior Publication Data

US 2007/0001420 A1 Jan. 4, 2007

(30) Foreign Application Priority Data

Jul. 1, 2005 (DE) .................. 10 2005 030 810

(51) Int. Cl.
B60G 7/00 (2006.01)

(52) U.S. Cl. .............................. 280/124.134

(58) Field of Classification Search ......... 280/124.128, 280/124.134, 124.135, 124.143, 124.136
See application file for complete search history.

(56) References Cited

U.S. PATENT DOCUMENTS

| | | | | |
|---|---|---|---|---|
| 4,556,238 A * | 12/1985 | Matschinsky | ........ | 280/124.135 |
| 4,655,474 A * | 4/1987 | Sautter | ................. | 280/124.146 |
| 4,671,531 A * | 6/1987 | Sautter et al. | .......... | 280/124.109 |
| 4,720,120 A * | 1/1988 | Shimatani et al. | ..... | 280/124.109 |
| 4,744,587 A * | 5/1988 | Veneau | ................... | 280/124.15 |
| 4,758,018 A * | 7/1988 | Takizawa et al. | ....... | 280/124.133 |
| 4,828,279 A * | 5/1989 | Matschinsky | ........ | 280/124.143 |
| 4,840,396 A * | 6/1989 | Kubo | ................... | 280/124.143 |
| 4,989,894 A * | 2/1991 | Winsor et al. | ......... | 280/124.143 |
| 5,037,127 A * | 8/1991 | Lin | ....................... | 280/124.135 |
| 5,100,165 A * | 3/1992 | Hespelt | .............. | 280/124.141 |
| 5,404,162 A * | 4/1995 | Sass et al. | ..................... | 348/86 |
| 5,415,427 A * | 5/1995 | Sommerer et al. | .... | 280/124.142 |
| 5,868,410 A * | 2/1999 | Kawabe et al. | ......... | 280/124.15 |
| 5,938,219 A * | 8/1999 | Hayami et al. | ........ | 280/124.135 |
| 6,099,005 A * | 8/2000 | Wakatsuki | ........... | 280/124.135 |
| 6,357,772 B1 * | 3/2002 | Pelz et al. | ............. | 280/124.135 |
| 6,412,797 B1 * | 7/2002 | Park | ..................... | 280/124.125 |
| 6,588,779 B2 * | 7/2003 | Sandahl et al. | ........ | 280/124.135 |
| 6,752,409 B1 * | 6/2004 | Kunert | ................ | 280/124.138 |
| 6,755,429 B1 * | 6/2004 | Buchwitz et al. | ...... | 280/124.109 |
| 2004/0140641 A1* | 7/2004 | Eppelein | .............. | 280/124.135 |
| 2005/0046136 A1* | 3/2005 | Sutton | ................. | 280/124.135 |
| 2005/0140110 A1* | 6/2005 | Lee et al. | .............. | 280/124.109 |
| 2005/0280241 A1* | 12/2005 | Bordini | ............... | 280/124.135 |

* cited by examiner

*Primary Examiner*—Paul N Dickson
*Assistant Examiner*—Robert A Coker
(74) *Attorney, Agent, or Firm*—Novak Druce + Quigg LLP

(57) ABSTRACT

The invention relates to an independent wheel suspension for the rear wheels of motor vehicles, having a wheel support which is hinge-connected to at least one upper and one lower control arm, the lower control arm being connected by way of two more or less horizontal arm bearings forming pivot axes on the body of the motor vehicle and on the wheel support and a guide arm of the wheel support to another bearing, and also having a bearing spring resting on the wheel support and a more or less vertically oriented telescopic shock absorber. For the creation of a structurally and elastokinematically favorable wheel suspension it is proposed, as viewed from above, that the other guide rod is mounted more or less in the lower guide rod plane and diagonally forward from the exterior toward the interior, in such a way that the intersection of imaginary extensions of the other guide rod and the rear bearing points of the lower guide rod is positioned beyond the extended wheel center axis.

12 Claims, 4 Drawing Sheets

INDEPENDENT WHEEL SUSPENSION FOR THE REAR WHEELS OF MOTOR VEHICLES

The invention relates to an independent wheel suspension for the rear wheels of motor vehicles.

BACKGROUND OF THE INVENTION

A wheel suspension such as this is disclosed, for example, by EP 0 288 654 131, and is also designated a trapezoidal guide rod shaft. The bearing spring, not shown, and the telescopic shock absorber generally rest on the wheel support and/or on the lower connecting or trapezoidal guide rod. In addition, the lower trapezoidal guide rod is connected to the wheel support by way of two guide rod bearings the extended pivot axis of which intersects as a tilted shaft the pivot axis of guide rod bearings upstream from the wheel suspension as viewed in the direction of travel of the motor vehicle. In the upper guide rod plane there are also two guide rods hinge-connected to the wheel support, the front guide rod of which, because of its spatial configuration, effects a specific elastokinematic roll steer effect of the wheel suspension with preferred understeering tendency in travel on curves.

The object of the invention is to indicate a generic wheel suspension which, in addition to a structurally favorable configuration of the functional components in relation to each other, also provides in the vehicle a guide for the wheels which is especially vibration-resistant and possesses specific elastokinematic properties.

SUMMARY OF THE INVENTION

It is proposed, in accordance with the invention that, with the wheel suspension viewed from the top, in essence the other guide rod acting as track rod in particular in the lower guide rod plane is inclined from the outside inward so that the point of intersection of imaginary extension of the other guide rod and the rear bearing points of the lower guide rod or trapezoidal guide rod is positioned beyond the extended axis of the center of the wheel. This configuration first of all yields advantageous intrinsic steering behavior of the wheel suspension in the presence of longitudinal forces acting on the wheel (in a braking process, for example) and in the presence of lateral forces (acting on the outer wheel during travel on a curve) in the direction of toe-in or understeer; the extent of the changes in track due to the sweepback of the other guide rod in relation to the control rod bearings may be defined by simple means. The position of the other guide rod in the lower guide rod plane results in uncoupling of toe-in and camber of the wheel and so prevents undesirable joint steering of the wheel in the event of understeer changes caused by deflection movements. Lastly, the mounting of the other guide rod in the lower guide rod plane permits especially favorable tying to the body or to a span of an underframe of the motor vehicle along with more harmonious (less bent at an angle) shape of the span and possibly more favorable deformation behavior in the event of a crash.

In addition, the self-steering behavior of the wheel suspension can be achieved under controlled conditions in a simple manner in that the rear rubber elastic bearings of the lower guide rod or trapezoidal guide rod are designed to have greater elastic temper than the front rubber elastic bearings. As a result of the associated greater resilience of the front guide rod bearings, the elastokinematic guiding of the wheels in the direction of toe-in continues to be supported when longitudinal and lateral forces are applied to the wheels. By preference at least the outer front guide rod bearing of the lower guide rod should be positioned closer to the wheel center axis than the rear bearings so that a larger, more effective lever arm is positioned on the wheel supports in the case of the longitudinal and lateral forces in question.

In an especially advantageous further development of the invention the support springs between the lower guide rod and the other guide rod may be positioned upstream from the wheel center and rest on a crossbeam mounted in the lower guide rod plane or below the latter on the wheel support. The support spring, which by preference may be a more or less cylindrical compression spring or a pneumatic spring, may as a result be depressed far downward and so free up work space or loading width in the area of the baggage compartment or loading space. If desired, the expanding mandrels otherwise required may be designed to be of smaller volume or may be dispensed with entirely. It is also advantageous for the support springs to be able to require less structural space as a result of the attainable transmission ratio of the support springs of <1. A specified pretensioning of the wheel support in the direction of rotation of the wheel in travel forward is provided over the entire path of the spring as a result of mooring the support springs upstream from the center of and directly on the wheel support. The direction of this pretensioning is not altered even when longitudinal forces occur (for example, during driving over obstacles). There is accordingly no "zero passage" of the pretensioning of the wheel support over the entire path of the spring; this has a beneficial effect on the comfort of the wheel suspension (rolling comfort, vibrational behavior).

It is favorable from the viewpoint of structure and production technology for the crossbeam to be in the form of two struts formed on the bearing recesses for the lower guide rod and guided together one spring recess.

4In addition, the crossbeam, as viewed from the top, may extend forward lengthwise in the center of the motor vehicle, in such a way that the more or less vertical longitudinal spring axis is positioned between the two pivot axes of the lower guide rod. By preference the entire cross-sectional area of the support springs may be positioned between the pivot axes in question.

In addition, in order to achieve a compact design of the wheel suspension favoring structural space, the lower guide rod and/or the other guide rod may be correspondingly arched so as to provide adequate clearance for the support springs mounted between them in the area of the support springs.

Another especially advantageous configuration of the invention provides that the telescopic shock absorber is provided with an additional spring operated in the event of extensive deflection of the wheel and hinge-connected to the rear of the central axis of the wheel, also on the wheel support. This configuration has a favorable effect on the pattern of the toe-in curve of the wheel suspension especially in the event of operation of the additional spring in the event of extensive deflection of the wheel. There arises on the wheel support a moment counteracting pretensioning of the support spring, a moment which twists the wheel support in the elastokinematic area in the direction opposite that of rotation of the wheel in forward drive, the other, lower, guide rod or track rod adjusting the wheel support in the direction of precise straight travel of the wheel. This has the result that on the whole no undesired self-steering occurs on the wheel suspension in the event of severe deflection of the wheel (as on an undulating roadway).

By preference the shock absorber is coupled below the center of the wheel in the area of the wheel support bracket.

The effect of the superposition function of the shock absorber as described with the back-up spring on the self-steer behavior of the wheel suspension may be further intensified by mounting the shock absorber so as to be tilted upward from 5 to 25 degrees, in particular around 15 degrees.

In an especially favorable structural configuration the shock absorber, as viewed from the side, may extend in front of the outer, rear guide rod support of the lower guide rod and the upper guide rod and thus be advantageously integrated into the prescribed periphery of the wheel suspension.

Lastly, in the case of the driven wheels of the motor vehicle the support springs and the shock absorber may be positioned on both sides of the respective drive shaft.

Two exemplary embodiments of the invention are explained in greater detail in what follows with reference to the schematic drawing, in which

BRIEF DESCRIPTION OF THE DRAWINGS

FIGS. 1 to 3 illustrate a left-side wheel suspension 10, which suspension is made up essentially of a wheel support 14, an upper individual guide rod 16, a lower trapezoidal guide rod 18, another individual guide rod 20, a support spring 32 in the form of a helical compression spring, and a more or less vertically oriented telescopic shock absorber 34. The wheel suspension on the right side is to be considered a mirror image of that on the left. In addition, the forward direction of travel of the motor vehicle is indicated by an arrow F.

DETAILED DESCRIPTION OF THE PREFERRED EMBODIMENT OF THE INVENTION

Figure 1:
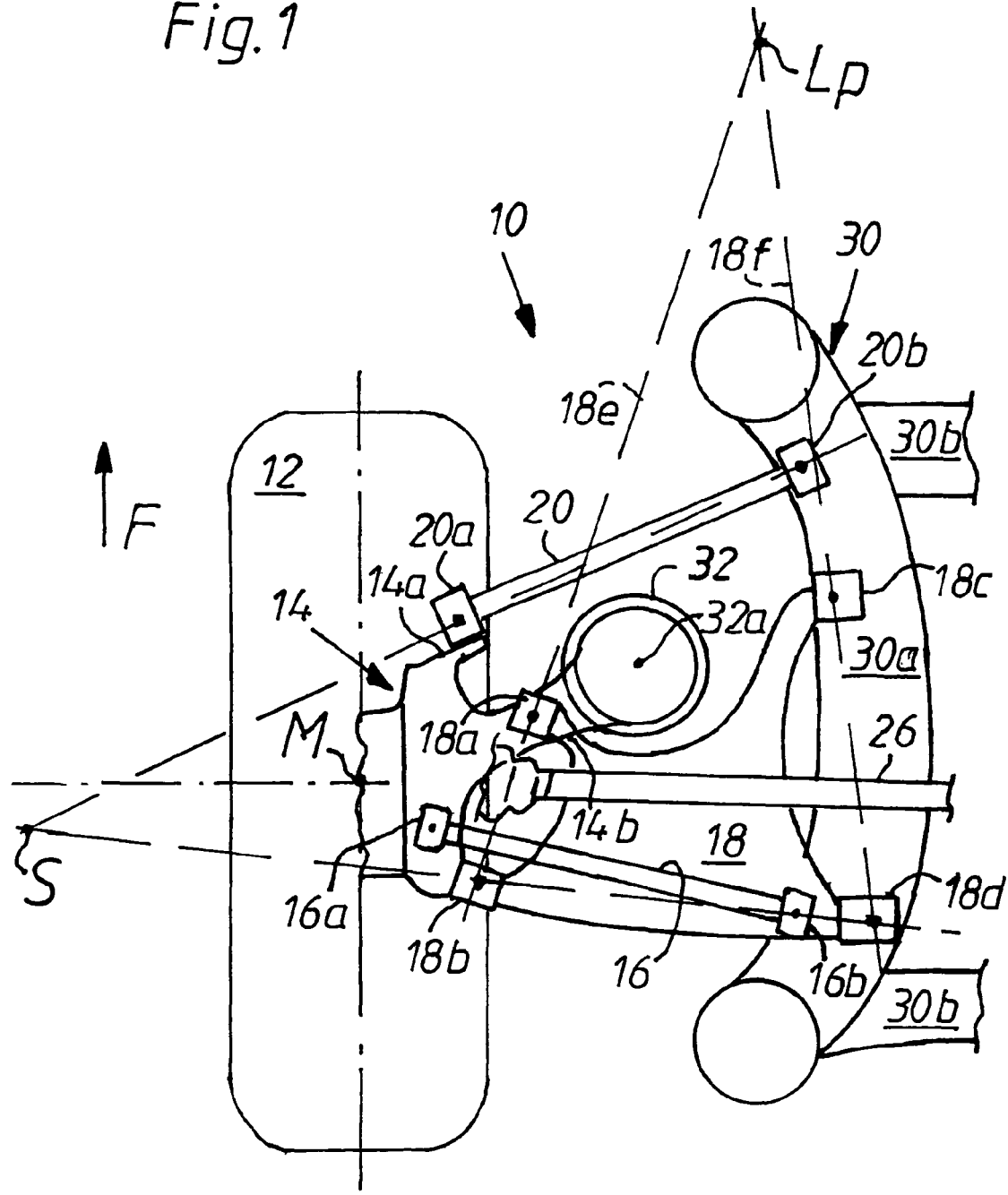
FIG. 1 presents a top view of a wheel suspension for the rear wheels of motor vehicles having and upper guide rod, a lower trapezoidal guide rod, another lower guide rod, a support spring, and a telescopic shock absorber.

The wheel support 14—in which the rear wheel 12 is rotatably mounted above a drive shaft 26 not shown—is guided in an upper guide rod plane (see FIG. 2) over the guide rod 16 with guide rod bearings 16a, 16b and in a lower guide rod plane by means of the guide rod 18 by way of guide rod bearings 18a, 18b and 18c, 18d, and, lastly, over the other guide rod 20 by way of guide rod bearings 20 by way of guide rod bearings 20a, 20b as a guide.

The guide rod bearings 16a, 18a, 18b, 20a are mounted, in a manner yet to be described, on the wheel support 14 on one side and on the body of the vehicle or in the exemplary embodiment (shown only in part) on an auxiliary frame 30 on the other side by conventional means to form drag bearings. The guide rod bearings in question could be conventional rubber-metal bush bearings and optionally in part ball bearings. The auxiliary frame 30 has on each side of the vehicle a spar 30a and cross-spars 30b connecting them to form a frame, the lower guide rod bearings 18c, 18d, 20b on the structure side being mounted on the spar 30a illustrated.

Figure 2:
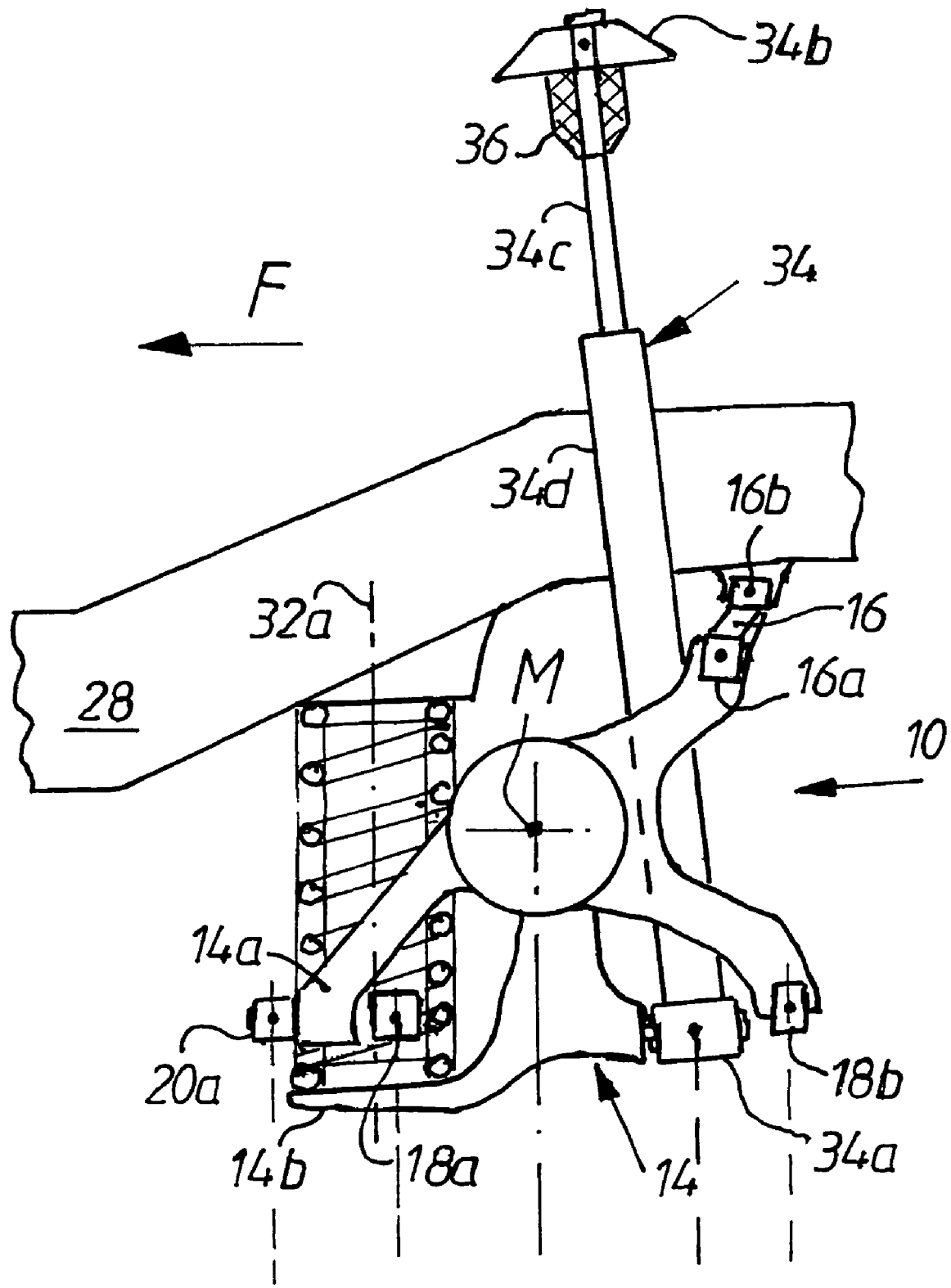
FIG. 2 a side view of the wheel suspension shown in FIG. 1.

It is to be seen in the side view of FIG. 2 that the guide rod bearings 16a and 18b of the upper guide rod 16 and the lower guide 18 are positioned more or less vertically one above the other and distinctly behind the wheel axis of rotation M and so as it were form a steering axle of the wheel suspension 10. On the other hand, the guide rod bearings 18a, 18c are positioned in advance of the wheel center axis M, the outer guide rod bearing 18a being positioned closer to the wheel center axis M than the outer guide rod bearings 18b, 16a positioned behind this axis.

As is to be seen in FIG. 1 and FIG. 2, the other guide rod 20 is connected in the lower guide rod plane to guide rod 18 by a steering arm 14a on the wheel support 14 and extends diagonally forward from the exterior (guide rod bearing 20a) inward (toward guide rod 20b). The guide rod bearing 20a is positioned even further in front of the wheel center axis M than the guide rod bearing 18a.

The spatial configuration selected for the guide rod bearings 18b, 18d and the guide rod bearings 20a, 20b is such that imaginary extensions (broken lines) form an intersection S which, as is to be seen in FIG. 1, is positioned outside the rear wheel 12 and behind the wheel axis of rotation M.

Consequently, a lateral force or a longitudinal force applied to the rear wheel 12 causes in the elastokinematic area of the wheel guide 10 guiding of the rear wheel 12 in the direction of toe-in and accordingly understeering driving behavior of the vehicle. In order to support this understeering tendency, the spring hardness of the steering bearings 18b, 18d (or of one of them) positioned to the rear of the wheel center axis M is designed to be greater than that of the steering bearings 18a, 18c positioned to the front of the wheel center axis M, while the steering bearings 20a, 20b of the guide rod 20 acting as track rod are designed to be harder.

The two guide bearings 18a, 18b on the wheel support side and the two guide bearings 18c, 18d on the structure side, again as is to be seen in FIG. 1 pivot axes 18e, 18f (indicated by broken lines) imaginary extensions of which in the direction of travel F of the vehicle forward, come together to form a longitudinal pole L. Since the steering bearings 20a, 20b are positioned outside these pivot axes 18e, 18f, a specific self-steer behavior of the wheel suspension 10 or a specific toe-in curve of the rear wheel 12 may be imparted by way of the guide rod 20 acting as it were as a track rod.

Between the lower front guide rod 20 and the trapezoidal guide rod 18 the support spring 32 of the wheel suspension 10 rests on one side on the structure of one longitudinal support 28 and on the other side on the wheel support 14. The support spring 32 is a more or less cylindrical helical compression spring with a vertically oriented longitudinal axis 32a.

The support spring 32 rests on a bracket 14b formed on the wheel support 14 and guided downward and inward, its longitudinal axis, as is to be seen, being positioned distinctly to the front of the wheel center axis M and the bracket 14b below this wheel center axis M. The required road clearance of the vehicle being taken into account, this permits a particularly low mounting of the support spring 32 resting on the longitudinal carrier 28. As a result of mounting of the support spring 32 to the front of the wheel center axis M, in travel forward the support spring 32 exerts pretensioning on the wheel carrier 14 which acts in the direction of rotation of the rear wheel 12.

On the basis of the spatial configuration of the bracket 14, as seen from the top the support spring 32 is in addition positioned toward the front and toward the longitudinal center of the vehicle so that the more or less vertical longitudinal axis 32a of this spring and accordingly its entire cross-sectional surface are positioned between the two imagined extensions of the pivot axes 18e, 18f of the lower guide rod 18. As is to be seen, the lower guide rod 18 is also configured to be correspondingly arched to provide clearance for passage of the support spring 32 mounted between such rods in the area of the support spring 32.

Since the support spring 32 is positioned closer to the instantaneous axis of rotation (not illustrated) of the wheel suspension 10 than is the wheel center M, the spring transmission ratio is <1, that is, the support spring 32 may be made shorter with a suitably adapted spring ratio.

A telescopic shock absorber 34 is also hinge-connected on the wheel support 14 by way of a bearing 34a; it is hinge-connected on the other side by a absorber bearing 34b of conventional design to the structure of the vehicle (not shown).

As is to be seen in FIG. 2, the shock absorber 34 is hinge-connected to the wheel support 14 by way of the bearing 34a, well behind the wheel center axis M and below it. In addition, the shock absorber 34 is mounted above to the front at an angle of 15 degrees to the vertical.

There is mounted around the piston rod 34c of the shock absorber 34 an additional spring in the form of a rubber elastic bumper 36 which is compressed in the event of extensive deflection of the rear wheel 12 on the cylindrical tubing 34d of the shock absorber 34 and increases total spring hardness of the wheel suspension 10.

The additional spring 36 generates through the bearing point of the bearing 34a of the shock absorber positioned to the rear of the wheel center axis M generates a moment counteracting pretensioning by the support spring 32; this moment effecting a more or less extensive track adjustment in the elastokinematic area of the wheel suspension 10.

As an option, another additional spring 36 in the form of a bumper may also be provided inside the support spring 32, one which would be additionally compressed on the arm 34b of the wheel support 14 in the event of marked deflection of the rear wheel 12 and could apply an additional pretensioning force to the wheel support 14. The spring hardness of the two additional springs could optionally be specifically coordinated with each other, by preference the additional spring 36 on the shock absorber 34 being more rigid than the additional spring 36 of the support spring 32.

Figure 3:
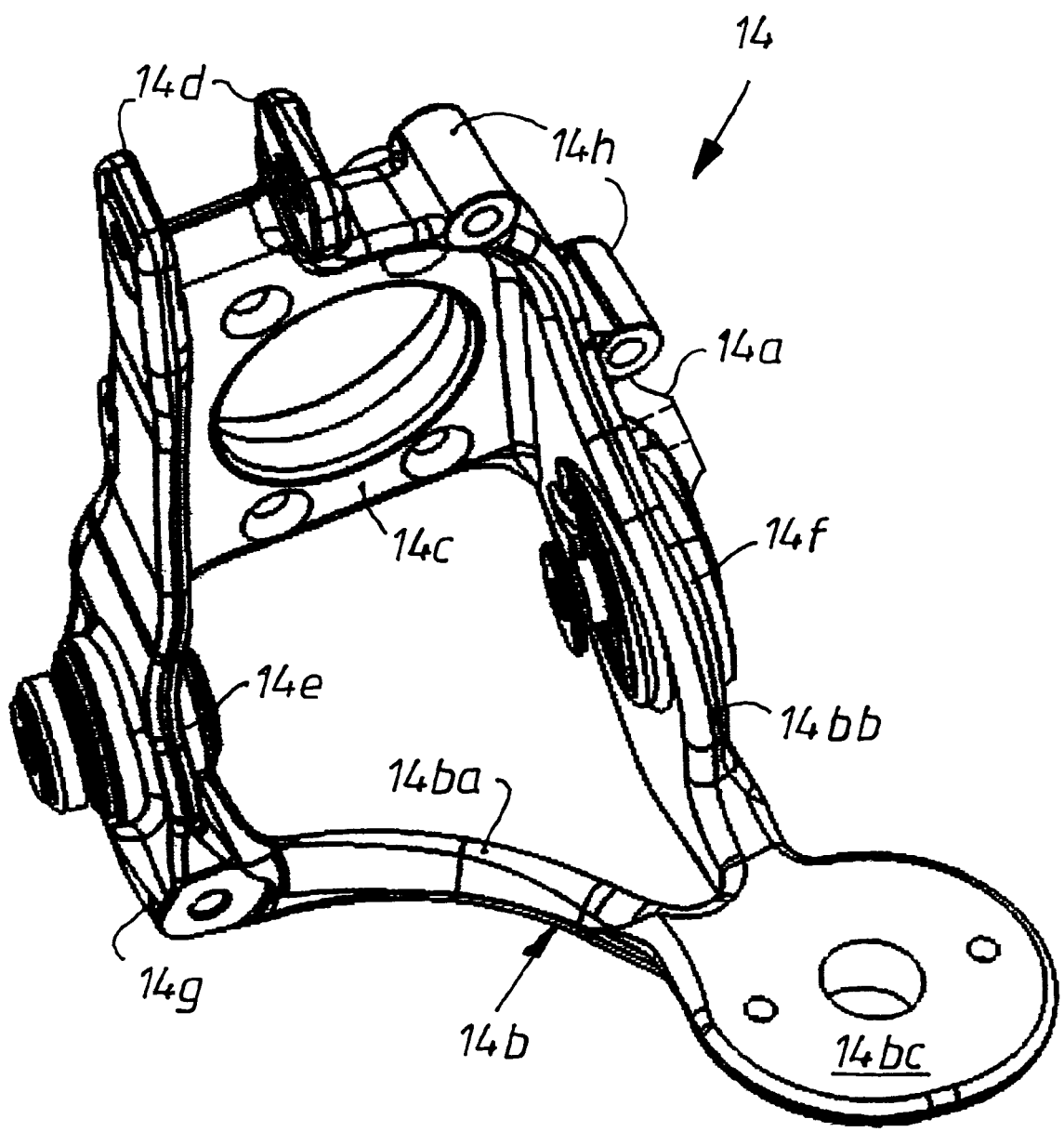
FIG. 3 the wheel support of the wheel suspension shown in FIGS. 1 and 2, diagonally from the top inward in a stereoscopic view.

The wheel support 14 is shown in FIG. 3 from the top inward in a space image view. As is to be seen, the base section 14c of the wheel support in which the pivot mounting (not shown) of the rear wheel 12 is seated is provided with bearing recesses 14d, 14e, 14f to which the connecting rod bearings 16a, 18a, and 18c may be connected. The bracket 14b for support of the support spring 32 is formed on the lower, annular, bearing seats 14e, 14f of the connecting rod bearings 18a, 18b and consists of two struts 14ba, 14bb which together with a lower, disk-shaped spring seat 14bc form the bracket 14b. The spring seat 14bc of the bracket 14b optionally may be configured directly on the lower spring plate receiving the support spring 32.

In addition, the steering arm 14a (almost hidden in the view presented) and a mounting lug 14g are formed on the wheel support 14. The mounting lug 14g is formed on the bearing recess 14e and serves to moor the bearing 34a of the shock absorber. Two additional mounting lugs 14h on the base section 14c serve the purpose of fastening a caliper (not shown) of the disk brake of the vehicle.

Figure 4:
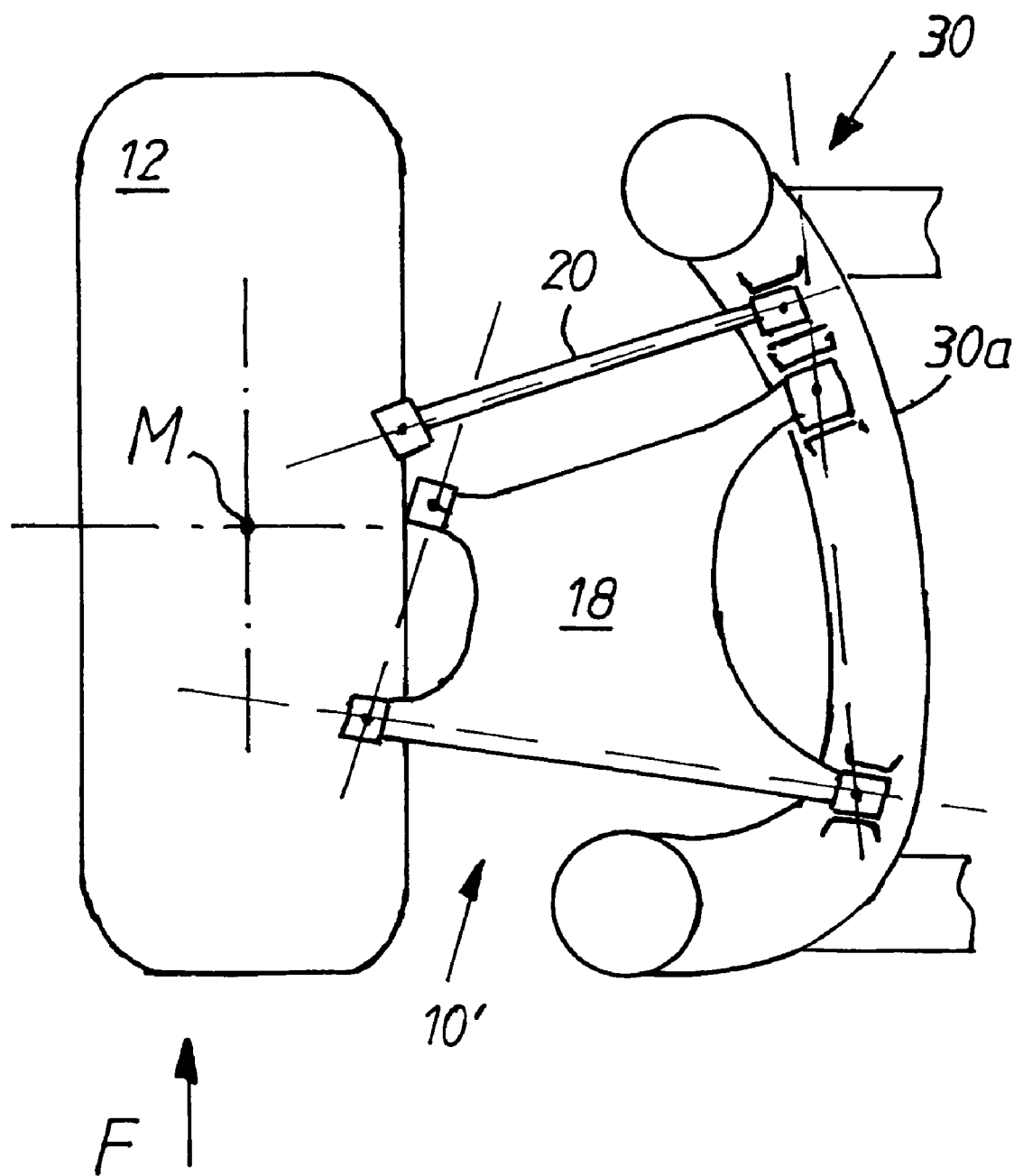
FIG. 4. a top view of the lower guide rod plane of another wheel suspension as shown in FIGS. 1 to 3, but with no support spring and telescopic shock absorber resting on the wheel support.

Another exemplary embodiment of the invention is shown in FIG. 4. It is explained only to the extent that it differs significantly from the wheel suspension shown in FIGS. 1 to 3. Identical parts are provided with the same reference numbers.

FIG. 4 shows the lower connecting rod plane of a wheel suspension 10' with a lower, trapezoidal, connecting rod 18 and another, front, connecting rod 20, which as described above is hinge-connected to the wheel support 14 (not shown) and on the body side to the spar 30a of the auxiliary frame 30.

In contrast to FIGS. 1 to 3 the support spring 32 and the shock absorber 34 are not mounted with the additional spring 36 as described in the foregoing. Thus, the support spring 32 rests on the connecting rod 18 (not shown). The shock absorber also rests on the connecting rod 18 (optionally configured as telescopic leg) or alternatively on the wheel support 14.

The invention claimed is:

1. A wheel suspension for a motor vehicle comprising:
a wheel support;
a lower control arm pivotally connected at an outer end thereof to said wheel support at forwardly and rearwardly disposed connection points thereof, and at an inner end thereof to a portion of a body of said vehicle at forwardly and rearwardly disposed points thereof, wherein said forwardly disposed inner and outer connection points are spaced at a distance shorter than the distance between said rearwardly disposed inner and outer connection points;
an upper control arm pivotally connected at an outer end thereof to said wheel support and at an inner end thereof to a portion of said body of said vehicle;
a guide rod disposed forwardly of said upper control arm, having an outer end thereof pivotally connected to said wheel support at a point substantially in a plane including the pivotal connections of said lower control arm, extending upwardly, forwardly and inwardly from said point thereof, and pivotally connected at an inner end thereof to a portion of said body of said vehicle;
a spring seated on a segment of said wheel support and connected to a portion of said body of said vehicle; and
a shock absorber supported on said wheel support connected to a portion of said body of said vehicle.

2. A wheel suspension according to claim 1 wherein said pivotal connections of said lower control arm comprise elastic rubber-metal bearings and the elastic portions of the rearwardly disposed pivotal connections of said lower control arm have a spring hardness greater than the elastic portions of the forwardly disposed pivotal connections thereof.

3. A wheel suspension according to claim 1 wherein said forwardly disposed, outer pivotal connection of said lower control arm is disposed nearer the rotational axis of said wheel support than said rearwardly disposed, outer pivotal connection thereof.

4. A wheel suspension according to claim 1 wherein said spring is disposed between said lower control arm and said guide control rod, forwardly of the rotational axis of said wheel, and is supported on a portion of said wheel support no higher than said plane including the connections of said lower control arm.

5. A wheel suspension according to claim 4 wherein said wheel support includes a pair of struts providing a segment at the ends thereof on which said spring is supported.

6. A wheel suspension according to claim 5 wherein said struts project inwardly so as to position said spring support segment between said forwardly and rearwardly pivotal connections of the inner end of said lower control arm to said body of said vehicle.

7. A wheel suspension according to claim 6 wherein said spring is disposed between a linear line extending through said inner pivotal connections and a linear line extending through said outer pivotal connections of said lower control arm.

8. A wheel suspension according to claim 1 wherein said spring is disposed between said lower control arm and said guide control rod.

9. A wheel suspension according to claim 1 wherein said shock absorber is pivotally connected to said wheel support rearwardly of a rotational axis of said wheel support.

10. A wheel suspension according to claim 9 wherein said shock absorber is pivotally connected to said wheel support at a level below the level of the rotational axis of said wheel support.

11. A wheel suspension according to claim 1 wherein said shock absorber is inclined forwardly and upwardly at an angle in the range of 5 to 25 degrees.

12. A wheel suspension according to claim 1 wherein said shock absorber extends from a point forwardly of the rearwardly disposed, outer pivotal connection of said lower control arm to said wheel support, to a point forwardly of said upper control arm.

* * * * *